(12) United States Patent
Tamanaha

(10) Patent No.: US 12,169,946 B2
(45) Date of Patent: Dec. 17, 2024

(54) ANGULAR DIRECTION IDENTIFYING DEVICE AND ANGULAR DIRECTION IDENTIFYING METHOD

(71) Applicant: HONDA MOTOR CO., LTD., Tokyo (JP)

(72) Inventor: Ryusuke Tamanaha, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 41 days.

(21) Appl. No.: 18/159,795

(22) Filed: Jan. 26, 2023

(65) Prior Publication Data
US 2023/0267645 A1 Aug. 24, 2023

(30) Foreign Application Priority Data
Feb. 22, 2022 (JP) .................................. 2022-025265

(51) Int. Cl.
*G06T 7/73* (2017.01)
*G06T 7/246* (2017.01)

(52) U.S. Cl.
CPC ................ *G06T 7/74* (2017.01); *G06T 7/248* (2017.01); *G06T 2207/30252* (2013.01)

(58) Field of Classification Search
CPC . G06T 7/74; G06T 7/248; G06T 2207/30252; G06T 2207/30244; G01S 19/45; G01B 11/00
See application file for complete search history.

(56) References Cited

U.S. PATENT DOCUMENTS

| | | | |
|---|---|---|---|
| 2007/0115284 A1* | 5/2007 | Kim | G06T 7/70 345/426 |
| 2011/0275408 A1 | 11/2011 | Kulik | |
| 2021/0190518 A1* | 6/2021 | Heyl | G01C 21/3492 |
| 2021/0206403 A1* | 7/2021 | Vrba | B61L 25/026 |

FOREIGN PATENT DOCUMENTS

| | | |
|---|---|---|
| JP | 2009-157778 A | 7/2009 |
| JP | 2011-2346 A | 1/2011 |
| JP | 2012-122760 A | 6/2012 |

(Continued)

OTHER PUBLICATIONS

Japanese Office Action dated Jun. 6, 2023 issued in corresponding Japanese application No. 2022-025265 (4 pages).

*Primary Examiner* — Michael Lee
(74) *Attorney, Agent, or Firm* — Rankin, Hill & Clark LLP

(57) ABSTRACT

An angular direction identifying device includes: a photographed image acquiring unit configured to acquire a photographed image by a camera provided in a movable body; an angular direction information acquiring unit configured to acquire angular direction information in a case where a predetermined physical object suggesting an angular direction is shown in the photographed image, the angular direction information indicating the angular direction suggested by the predetermined physical object; and a view-axis angular direction identifying unit configured to identify an angular direction in which a view axis of the camera is pointed, based on the angular direction information and a position relation between the predetermined physical object in the photographed image and the view axis of the camera.

5 Claims, 5 Drawing Sheets

(56) References Cited

FOREIGN PATENT DOCUMENTS

| JP | 2015-165246 A | 9/2015 | | |
|----|---------------|--------|---|---|
| JP | 2019-144668 A | 8/2019 | | |
| WO | 2018/142533 A1 | 8/2018 | | |
| WO | WO-2019172941 A1 * | 9/2019 | ............ | G01C 21/28 |
| WO | WO-2021133395 A1 * | 7/2021 | ............ | G06F 16/29 |

* cited by examiner

FIG.4

| | | |
|---|---|---|
| EXAMPLE 1 | (sunflower image with arrow H1, F, A1, M) | PREDETERMINED PHYSICAL OBJECT: SUNFLOWER (SUFFICIENT GROWTH)<br>ANGULAR DIRECTION SUGGESTED BY PREDETERMINED PHYSICAL OBJECT: EAST<br>POINTED ANGULAR DIRECTION OF VIEW AXIS: NORTH |
| EXAMPLE 2 | (building with shadow H2, F, A1, M) | PREDETERMINED PHYSICAL OBJECT: SHADOW (CURRENT POSITION, CURRENT DATE AND TIME)<br>ANGULAR DIRECTION SUGGESTED BY PREDETERMINED PHYSICAL OBJECT: EAST<br>POINTED ANGULAR DIRECTION OF VIEW AXIS: NORTH |
| EXAMPLE 3 | (pole group with arrow H3, F, Fa, Fb1, Fb2, A1, M) | PREDETERMINED PHYSICAL OBJECT: PREDETERMINED POLE GROUP<br>ANGULAR DIRECTION SUGGESTED BY PREDETERMINED PHYSICAL OBJECT: SOUTH<br>POINTED ANGULAR DIRECTION OF VIEW AXIS: SOUTH |

FIG.5

| | | |
|---|---|---|
| EXAMPLE 4 | (image of guardrail F with Fa, Fb, H4, A1, M) | PREDETERMINED PHYSICAL OBJECT |
| | | PREDETERMINED GUARDRAIL |
| | | ANGULAR DIRECTION SUGGESTED BY PREDETERMINED PHYSICAL OBJECT |
| | | NORTH |
| | | POINTED ANGULAR DIRECTION OF VIEW AXIS |
| | | NORTH |
| EXAMPLE 5 | (image of road surface sign F with A1, M) | PREDETERMINED PHYSICAL OBJECT |
| | | PREDETERMINED ROAD SURFACE SIGN |
| | | ANGULAR DIRECTION SUGGESTED BY PREDETERMINED PHYSICAL OBJECT |
| | | NORTH |
| | | POINTED ANGULAR DIRECTION OF VIEW AXIS |
| | | NORTH |

ANGULAR DIRECTION IDENTIFYING DEVICE AND ANGULAR DIRECTION IDENTIFYING METHOD

INCORPORATION BY REFERENCE

The present application claims priority under 35 U.S.C. § 119 to Japanese Patent Application No. 2022-025265 filed on Feb. 22, 2022. The content of the application is incorporated herein by reference in its entirety.

BACKGROUND OF THE INVENTION

Field of the Invention

The present invention relates to an angular direction identifying device and an angular direction identifying method.

Description of the Related Art

There is known a movable body that includes a Global Positioning System (GPS) receiver to receive positioning signals sent by GPS satellites, detects the current position based on the positioning signals, and autonomously travels using the detection result of the current position (see Japanese Patent Laid-Open No. 2019-144668, for example).

However, in the case where the movable body moves in an environment in which it is hard to receive the positioning signals, there is a problem in that the decrease in positioning accuracy decreases the accuracy of the identification of an angular direction in which the movable body is moving, so that the movable body moves to a spot away from a predetermined movement route. As a measure against this problem, it is possible that the GPS receiver is improved such that the receiving sensitivity for the positioning signals is increased, but a new problem of the increase in the cost of the GPS receiver arises.

The present invention has an object to provide an angular direction identifying device and an angular direction identifying method that make it possible to identify the angular direction without using the positioning.

SUMMARY OF THE INVENTION

An aspect of the present invention is an angular direction identifying device including: a photographed image acquiring unit configured to acquire a photographed image by a camera provided in a movable body; an angular direction information acquiring unit configured to acquire angular direction information in a case where a predetermined physical object suggesting an angular direction is shown in the photographed image, the angular direction information indicating the angular direction suggested by the predetermined physical object; and a view-axis angular direction identifying unit configured to identify an angular direction in which a view axis of the camera is pointed, based on the angular direction information and a position relation between the predetermined physical object in the photographed image and the view axis of the camera.

An aspect of the present invention is the above angular direction identifying device including: a current position acquiring unit configured to acquire a current position; and a current date and time acquiring unit configured to acquire a current date and time, in which in a case where the angular direction suggested by the predetermined physical object varies depending on the current position and the current date and time, the view-axis angular direction identifying unit identifies the angular direction suggested by the predetermined physical object based on the current position acquired by the current position acquiring unit and the current date and time acquired by the current date and time acquiring unit, and identifies the angular direction in which the view axis is pointed, based on the identified angular direction.

An aspect of the present invention is the above angular direction identifying device including a predetermined physical object recognizing unit configured to detect the predetermined physical object from the photographed image based on whether a discrimination sign is put on the predetermined physical object, the discrimination sign indicating that the predetermined physical object is a physical object suggesting the angular direction.

An aspect of the present invention is the above angular direction identifying device, in which the view-axis angular direction identifying unit identifies the angular direction in which the view axis is pointed, based on the predetermined physical object that is positioned on a side of a movement route in the photographed image, the movement route being a route on which the movable body is moving.

An aspect of the present invention is the above angular direction identifying device including a forward angular direction identifying unit configured to identify an angular direction in which a forward direction of the movable body is pointed, based on the angular direction in which the view axis is pointed.

An aspect of the present invention is the above angular direction identifying device, in which the view-axis angular direction identifying unit identifies the angular direction in which the view axis is pointed, in at least one of a case where the movable body is in a predetermined area and a case where the movable body is moving.

An aspect of the present invention is an angular direction identifying method with an angular direction identifying device that identifies an angular direction, the angular direction identifying method including: a step of acquiring a photographed image by a camera provided in a movable body; a step of acquiring angular direction information in a case where a predetermined physical object suggesting an angular direction is shown in the photographed image, the angular direction information indicating the angular direction suggested by the predetermined physical object; and a step of identifying an angular direction in which a view axis of the camera is pointed, based on the angular direction information and a position relation between the predetermined physical object in the photographed image and the view axis of the camera.

According to an aspect of the present invention, it is possible to identify the angular direction without using the positioning.

BRIEF DESCRIPTION OF THE DRAWINGS

FIG. 4 is a schematic diagram showing exemplary photographed images and angular directions in which a view axis is pointed; and FIG. 5 is a schematic diagram showing exemplary photographed images and angular directions in which the view axis is pointed.

DETAILED DESCRIPTION OF THE PREFERRED EMBODIMENT

Figure 1:
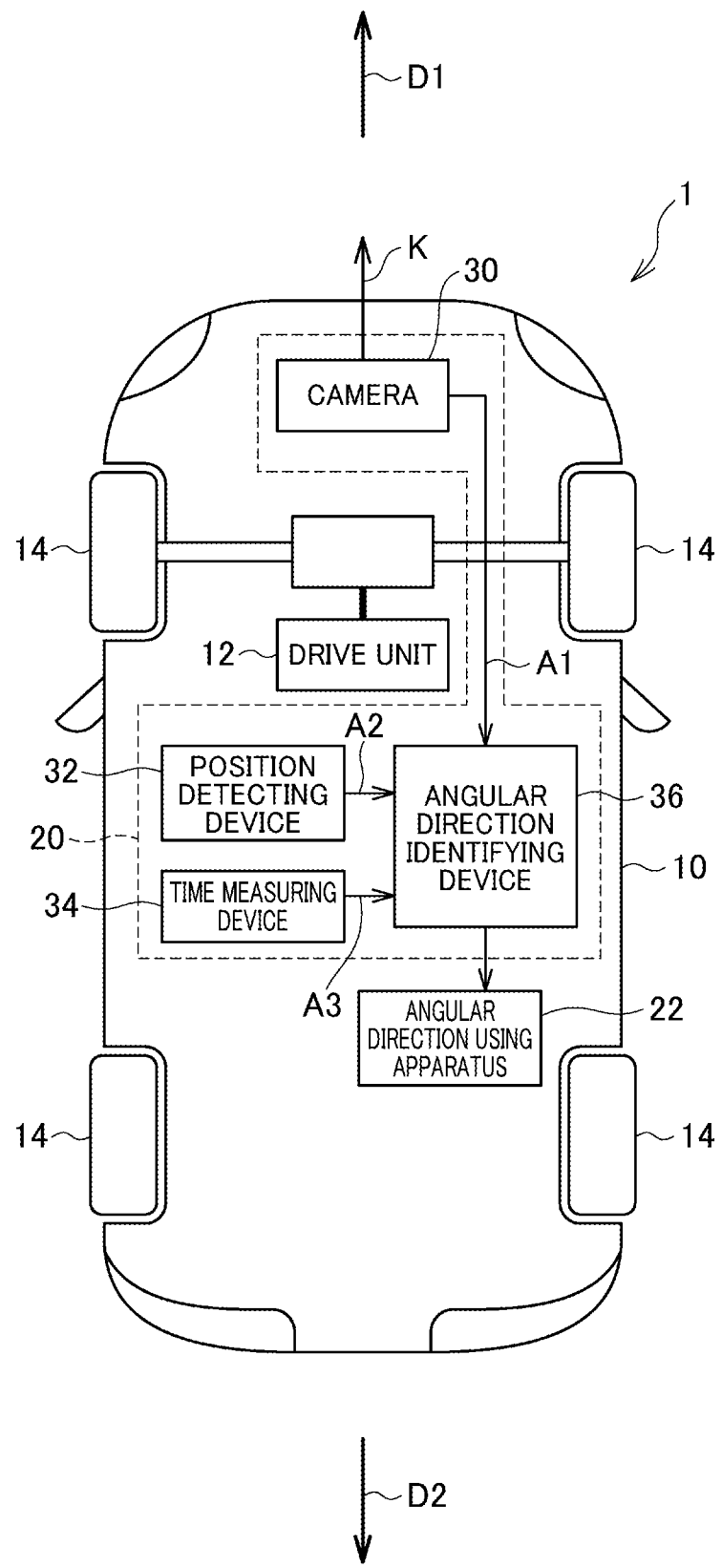
FIG. 1 is a diagram schematically showing the configuration of a vehicle according to an embodiment of the present invention.

An embodiment of the present invention will be described below with reference to the drawings.

In the following description, orientations indicated by terms "forward direction" and "rearward direction" correspond to the "forward movement direction" and "rearward movement direction" of a vehicle 1, respectively, and are denoted by reference characters D1 and D2, respectively.

FIG. 1 is a diagram schematically showing the configuration of the vehicle 1 according to the embodiment.

The vehicle 1 is an exemplary movable body, and includes a vehicle body 10 that corresponds to a main body of the movable body, a drive unit 12 that includes at least one of an electric motor and an internal combustion engine that output drive power, and a plurality of wheels 14 that are driven by the drive power of the drive unit 12 and cause the vehicle body 10 to go (to travel in the embodiment). The vehicle 1 in the embodiment is a four-wheel automobile in which the number of wheels 14 is four, but the number of wheels 14 and the shape of the vehicle body 10 are arbitrarily adopted.

Further, the vehicle 1 in the embodiment includes an angular direction identifying system 20 that identifies an angular direction, and an angular direction using apparatus 22 that is an in-vehicle device to use the angular direction. For example, the angular direction using apparatus 22 is an appropriate device such as a navigation device or an automatic driving device that controls the traveling of the vehicle 1 by autonomous navigation.

The angular direction identifying system 20 includes a camera 30, a position detecting device 32, a time measuring device (timer) 34 and an angular direction identifying device (electromagnetic compass) 36.

The camera 30 photographs the periphery of the vehicle 1, and outputs a photographed image A1 by the photographing, to the angular direction identifying device 36. In the embodiment, the camera 30 is installed on the vehicle body 10 such that a view axis K (also referred to as a gaze axis or optical axis) coincides with the forward direction D1 of the vehicle 1, and an angular direction in which the view axis K is pointed can be regarded as an angular direction in which the forward direction D1 of the vehicle body 10 is pointed (an angular direction in which the vehicle 1 is heading at the time of the forward movement of the vehicle 1).

The camera 30 may photograph a moving image constituted by photographed images A1 that are photographed at a predetermined frame rate, or may photograph a still image as the photographed image A1 at an appropriate interval.

The angular direction is a direction expressing a direction in which the view axis K of the camera 30 is pointed, as a relation with predetermined reference directions, on the basis of a current position A2 of the vehicle 1, and in the embodiment, four directions: "east", "west", "south" and "north" are used as the predetermined reference directions.

The position detecting device 32 is a device that detects the current position A2 of the vehicle 1 and that outputs the current position A2 to the angular direction identifying device 36. The position detecting device 32 in the embodiment includes a GNSS (Global Navigation Satellite System) receiving device that receives positioning signals transmitted from a plurality of positioning satellites and identifies the current position A2 based on the positioning signals.

The time measuring device 34 measures a current date and time A3 that is a date and time at the current time point, and outputs the current date and time A3 to the angular direction identifying device 36.

The angular direction identifying device 36 is a device that identifies the angular direction based on a predetermined physical object F (FIG. 4) shown in the photographed image A1, and outputs the angular direction to the angular direction using apparatus 22. Further, the angular direction identifying device 36 identifies the angular direction using information about at least one of the current position A2 and the current date and time A3 depending on the kind of the predetermined physical object F, together with the photographed image A1.

The predetermined physical object F is a subject that is shown in the photographed image A1 and that is a feature (natural product or artificial product) suggesting the angular direction, and specific examples of the predetermined physical object F will be described later.

In the embodiment, the angular direction identifying device 36 includes a computer including a processor such as a Central Processing Unit (CPU) and a Micro-Processing Unit (MPU), a memory device (also referred to as a main memory device) such as a Read Only Memory (ROM) and a Random Access Memory (RAM), a storage device (also referred to as a sub memory device) such as a Hard Disk Drive (HDD) and a Solid State Drive (SSD), and an interface circuit with which the camera 30, the position detecting device 32, the time measuring device 34, sensors, peripheral apparatuses and the like are connected. In the vehicle 1 in the embodiment, an Electronic Control Unit (ECU) is used as the computer. The processor executes a computer program stored in the memory device or the storage device, and thereby, the angular direction identifying device 36 realizes various functions relevant to the angular direction identification. The angular direction identifying device 36 may include a plurality of computers, and the respective computers may realize the various functions relevant to the angular direction identification in cooperation.

Figure 2:
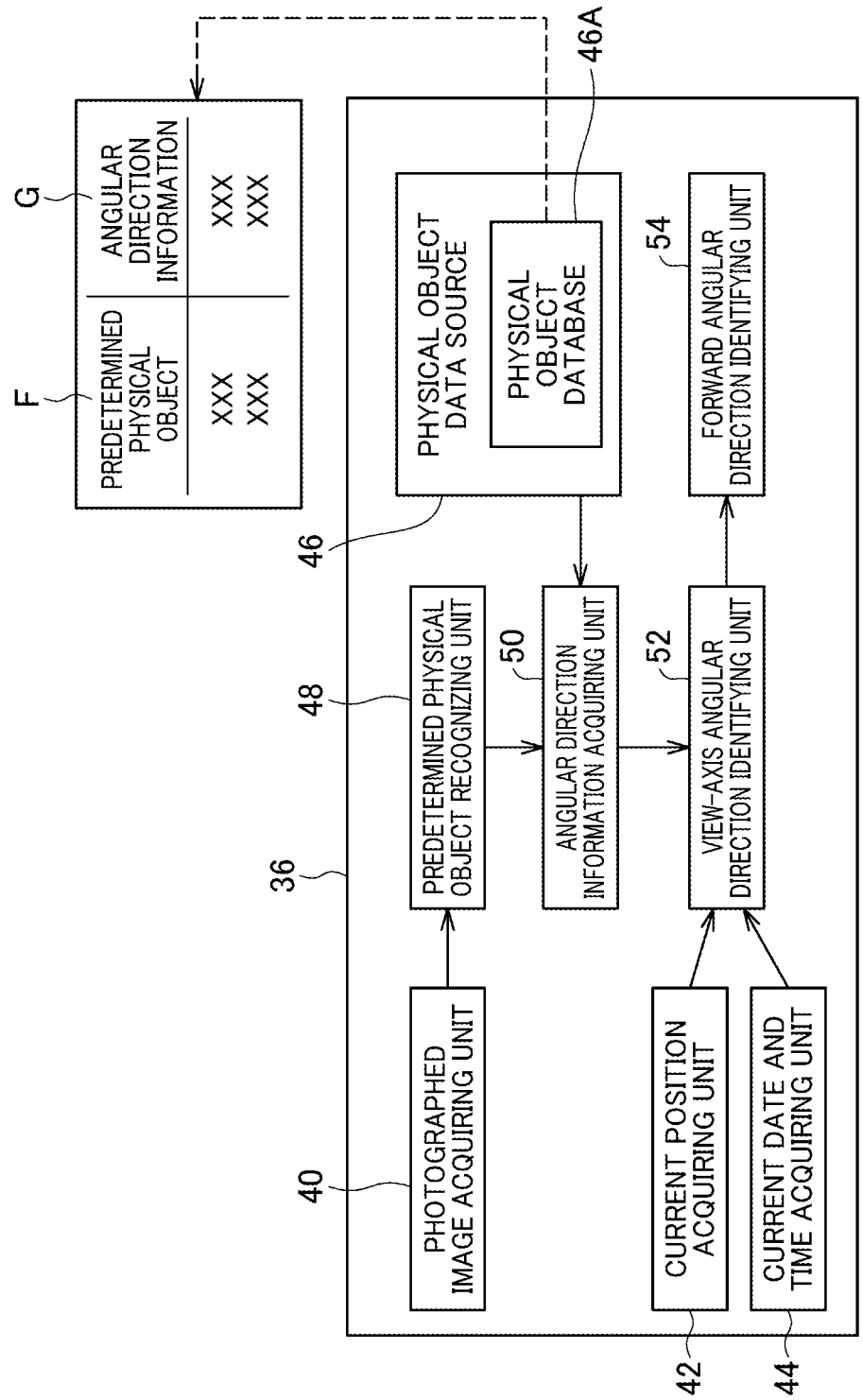
FIG. 2 is a diagram showing the functional configuration of an angular direction identifying device.

FIG. 2 is a diagram showing the functional configuration of the angular direction identifying device 36.

The angular direction identifying device 36 includes a photographed image acquiring unit 40 that acquires the photographed image A1 from the camera 30, a current position acquiring unit 42 that acquires the current position A2 from the position detecting device 32, and a current date and time acquiring unit 44 that acquires the current date and time A3 from the time measuring device 34.

Further, the angular direction identifying device 36 includes a physical object data source 46, a predetermined physical object recognizing unit 48, an angular direction information acquiring unit 50, a view-axis angular direction identifying unit 52, and a forward angular direction identifying unit 54.

The physical object data source 46 previously stores a physical object database 46A. The physical object database 46A is data in which information (referred to as angular direction information G hereinafter) indicating the angular direction suggested by the above predetermined physical object F is recorded for each predetermined physical object F.

The predetermined physical object F includes a natural product such as a sunflower, the sun, the moon and a shadow appearing at a physical body, and an artificial product (including a product resulting from processing a natural product) having a shape, array or sign that suggests the angular direction.

For example, each of the sun and the moon is a natural product that suggests the angular direction by its position. The position of each of the sun and the moon changes depending on the current position A2 and the current date and time A3, and therefore, the angular direction information G about each of the sun and the moon contains data such as a calculation expression and a numerical value table for deriving the angular direction of the position of each of the sun and the moon using the current position A2 and the current date and time A3 as parameters.

For example, the shadow extending from the physical body is a natural product that suggests the angular direction by its extending direction. The extending direction changes depending on the position of the sun at that time, that is, the current position A2 and the current date and time A3, and therefore, the angular direction information G about the shadow contains data such as a calculation expression and a numerical value table for deriving the angular direction of the position of the sun using the current position A2 and the current date and time A3 as parameters, similarly to the sun described above.

For example, the sunflower is a natural product that suggests the angular direction by its orientation because of having a property of always flowering looking in orientation toward the east after sufficient growth. Hence, the angular direction information G about the sunflower contains "east" that is the angular direction suggested by the orientation of the sunflower. The sunflower before the sufficient growth has a property of changing the looking orientation in accordance with the movement of the sun. Accordingly, the angular direction information G about the sunflower before the sufficient growth contains data such as a calculation expression and a numerical value table for deriving the angular direction of the position of the sun using the current position A2 and the current date and time A3 as parameters, similarly to the sun and the shadow described above.

Examples of the artificial product include a product such as a guardrail or a lane that suggests a particular angular direction by the extension direction, a physical body group such as a pole group that suggests a particular angular direction by the array direction, and a construction product that has a shape (an arrow shape or the like) indicating a particular angular direction. The angular direction suggested by the extension direction, the array direction or the shape is previously stored in the angular direction information G about the artificial product that is the predetermined physical object F.

In the embodiment, a discrimination sign Fa (FIG. 4: Example 3) allowing the discrimination from an artificial product that does not suggest the angular direction is put on the artificial product that is the predetermined physical object F. Further, a direction indicating sign Fb (FIG. 5: Example 4) allowing the discrimination of an orientation from a starting point to an ending point in the extension direction or the array direction is put on the predetermined physical object F that suggests the angular direction by the extension direction or the array direction.

The predetermined physical object recognizing unit 48 detects the predetermined physical object F from the photographed image A1 by image recognition. Specifically, for the predetermined physical object F that is a natural product, the predetermined physical object recognizing unit 48 detects the predetermined physical object F by pattern matching for shape. Further, for the predetermined physical object F that is an artificial product, the predetermined physical object recognizing unit 48 detects the predetermined physical object F by recognition of the discrimination sign Fa or by pattern matching for the shape of the artificial product. The predetermined physical object recognizing unit 48 may detect the predetermined physical object F by a recognition process using an Artificial Intelligence (AI).

In the case where the predetermined physical object F is detected from the photographed image A1 by the predetermined physical object recognizing unit 48 (that is, in the case where the predetermined physical object F is shown in the photographed image A1), the angular direction information acquiring unit 50 acquires the angular direction information G corresponding to the predetermined physical object F, from the physical object data source 46.

The view-axis angular direction identifying unit 52 identifies the angular direction in which the view axis K is pointed, based on the angular direction information G and the position relation between the predetermined physical object F in the photographed image A1 and the view axis K of the camera 30.

The forward angular direction identifying unit 54 identifies the angular direction in which the forward direction D1 of the vehicle body 10 is pointed, by correcting the angular direction in which the view axis K is pointed based on an angle α between the view axis K and a reference axis (vehicle central axis) in the forward direction D1 of the vehicle body 10.

More specifically, in the embodiment, the view axis K of the camera 30 coincides with the forward direction D1 of the vehicle 1 as described above, and therefore, the angle α is zero. On the other hand, for example, in the case where the view axis K of the camera 30 is installed so as to be oriented in a lateral direction of the vehicle body 10 and the angle α is not zero, the forward angular direction identifying unit 54 identifies the angular direction in which the forward direction D1 of the vehicle body 10 is pointed, by displacing the angular direction in which the view axis K is pointed, by the angle α.

The angular direction identified by the forward angular direction identifying unit 54 is input to the angular direction using apparatus 22, and is used for various controls (a navigation control, an autonomous traveling control and the like) in the angular direction using apparatus 22. Thereby, the angular direction using apparatus 22 can identify the angular direction, without separately including angular direction detecting means (for example, a gyroscope sensor or the like) for detecting the angular direction. Further, even in the case where the angular direction using apparatus 22 includes the angular direction detecting means for detecting the angular direction, it is possible to correct the detection result of the angular detection means, using the angular direction identified by the angular direction identifying device 36, and to realize a high-accuracy angular direction detection even in an environment or situation in which the detection sensitivity of the angular direction detecting means is low.

Figure 3:
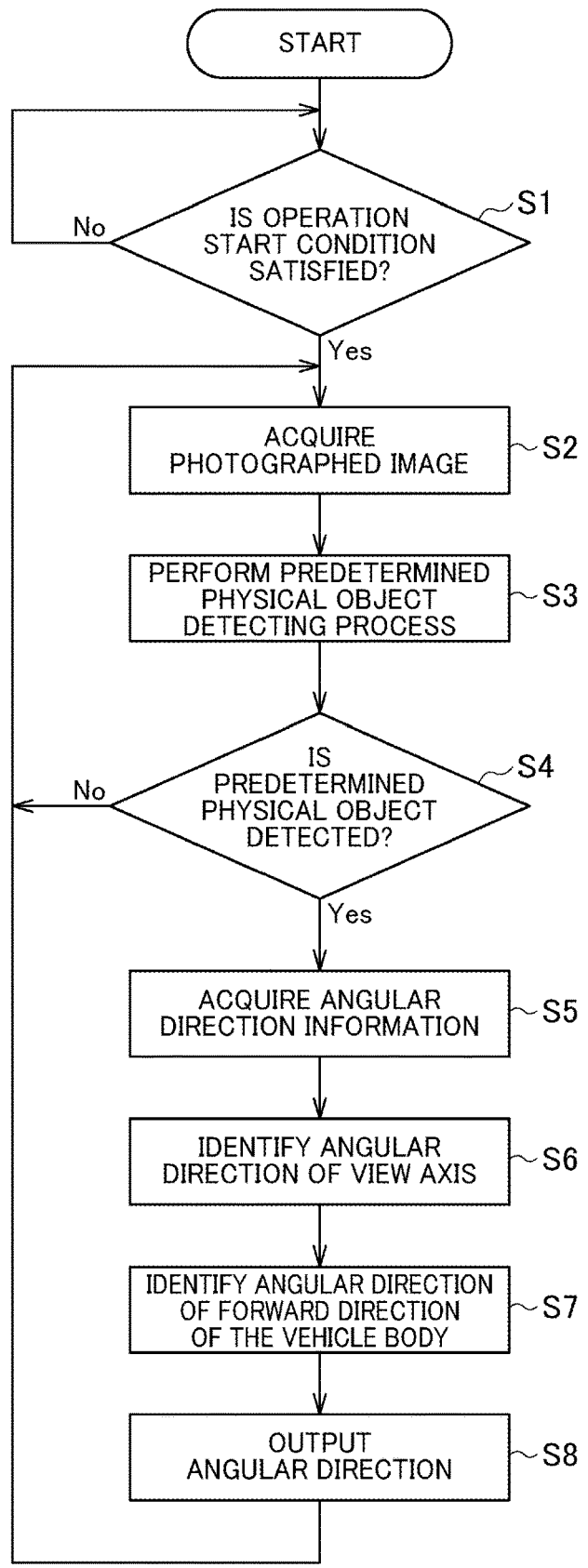
FIG. 3 is a flowchart showing an operation of an angular direction identifying system.

FIG. 3 is a flowchart showing an operation of the angular direction identifying system 20.

In the vehicle 1, each unit of the angular direction identifying system 20 starts to operate at an appropriate timing (a timing when a power switch or an ignition key is turned on, a traveling start timing, or the like). First, in the angular direction identifying device 36, the above processor determines whether a predetermined operation start condition is satisfied (step S1). The operation start condition is a condition corresponding to a situation in which the effectiveness of the angular direction identification is high. Specifically, the operation start condition is satisfied in at least one of a case where the predetermined vehicle 1 is in a predetermined area and a case where the vehicle 1 is traveling (moving). The predetermined area is an area where the receiving status for the positioning signals is not good, an area for which three-dimensional map information specifying the angular direction does not exist, or the like. Since the angular direction identifying device 36 executes the operation for identifying the angular direction with the condition that the operation start condition is met, the operation is restrained from being performed in a situation in which the effectiveness of the angular direction identification is low.

In the case where the operation start condition is met (step S1: Yes), the photographed image acquiring unit 40 acquires the photographed image A1 from the camera 30 (step S2). Next, the predetermined physical object recognizing unit 48 detects the predetermined physical object F by the image recognition of the photographed image A1 (step S3: predetermined physical object detecting process).

In the case where the predetermined physical object F is detected from the photographed image A1 (that is, in the case where the predetermined physical object F is shown in the photographed image A1) (step S4: Yes), the angular direction information acquiring unit 50 acquires the angular direction information G corresponding to the detected predetermined physical object F, from the physical object data source 46 (step S5). Then, the view-axis angular direction identifying unit 52 identifies the angular direction suggested by the predetermined physical object F, based on the angular direction information G, and identifies the angular direction in which the view axis K is pointed, based on the identified angular direction and the position relation between the predetermined physical object F in the photographed image A1 and the view axis K of the camera 30 (step S6).

In step S6, in the case where the current position A2 and the current date and time A3 are necessary for the identification of the angular direction suggested by the predetermined physical object F, that is, in the case where the angular direction information G indicates an angular direction using the current position A2 and the current date and time A3 as parameters, the view-axis angular direction identifying unit 52 identifies the angular direction suggested by the predetermined physical object F, using the current position A2 acquired by the current position acquiring unit 42 and the current date and time A3 acquired by the current date and time acquiring unit 44. Next, the view-axis angular direction identifying unit 52 identifies the angular direction in which the view axis K is pointed, based on the identified angular direction and the position relation between the predetermined physical object F in the photographed image A1 and the view axis K of the camera 30.

Specific modes of the angle identification in step S6 will be described later.

Next, the forward angular direction identifying unit 54 identifies the angular direction in which the forward direction of the vehicle body 10 is pointed, by correcting the angular direction in which the view axis K is pointed based on the angle α between the view axis K and the reference axis (vehicle central axis) in the forward direction of the vehicle body 10 (step S7) (in the embodiment, angle α=0°), and outputs the identified angular direction to the angular direction using apparatus 22 (step S8).

Thereby, the angular direction in which the view axis K of the camera 30 is pointed and the angular direction in which the forward direction of the vehicle body 10 is pointed are identified based on the photographed image A1 of the camera 30, without using the positioning. Accordingly, it is possible to identify the angular directions without depending on the accuracy of the positioning.

FIG. 4 and FIG. 5 are schematic diagrams showing exemplary photographed images A1 and angular directions in which the view axis K is pointed.

In a photographed image A1 in Example 1, a sunflower after the sufficient growth is shown as the predetermined physical object F. In this case, the view-axis angular direction identifying unit 52 identifies an angular direction H1 in which the sunflower is oriented in the photographed image A1, as "east", and identifies the angular direction in which the view axis K is oriented, as "north", based on the position relation with the sunflower.

In a photographed image A1 in Example 2, a shadow of a building is shown as the predetermined physical object F. In this case, the view-axis angular direction identifying unit 52 identifies the angular direction of the position of the sun, based on the current position A2 and the current date and time A3, and identifies the angular direction of a direction H2 in which the shadow extends, based on the angular direction of the position of the sun and the direction H2 of the shadow extending from the building ("EAST" in the illustrated example). Then, the view-axis angular direction identifying unit 52 identifies an angular direction ("NORTH" in the illustrated example) in which the view axis K is oriented, based on the position relation between the shadow and the camera 30.

In a photographed image A1 in Example 3, a pole group that is an artificial product suggesting the angular direction is shown as the predetermined physical object F. In this case, the view-axis angular direction identifying unit 52 identifies an angular direction suggested by an array direction H3 of the pole group, based on the angular direction information G ("SOUTH" in the illustrated example). Then, the view-axis angular direction identifying unit 52 identifies an angular direction ("SOUTH" in the illustrated example) in which the view axis K is oriented, based on the position relation between the pole group and the camera 30.

In Example 3, the above-described discrimination sign Fa is put on the pole group, and the view-axis angular direction identifying unit 52 determines that the pole group is the predetermined physical object F, by the image recognition of the discrimination sign Fa. Further, on a pole that is of the pole group and corresponds to the starting point in the array direction H3, a starting point sign Fb1 indicating the starting point is put, and on a pole that corresponds to the ending point, an ending point sign Fb2 indicating the ending point is put. Each of the starting point sign Fb1 and the ending point sign Fb2 is an example of the above-described direction indicating sign Fb indicating the orientation from the starting point to the ending point in the array direction H3, and the view-axis angular direction identifying unit 52 identifies the direction indicated by the array direction H3, based on the starting point sign Fb1 and the ending point sign Fb2.

In a photographed image A1 in Example 4, a guardrail is shown as the predetermined physical object F. In this case, the view-axis angular direction identifying unit 52 identifies an angular direction suggested by an extension direction H4 of the guardrail, based on the angular direction information G ("NORTH" in the illustrated example). Then, the view-axis angular direction identifying unit 52 identifies an angular direction ("NORTH" in the illustrated example) in which the view axis K is oriented, based on the position relation between the extension direction of the guardrail and the camera 30. On the guardrail, similarly to the pole group in Example 3, a discrimination sign Fa indicating the artificial product suggesting the angular direction and a direction indicating sign Fb indicating the orientation of the extension direction H4 are also put.

In a photographed image A1 in Example 5, a road surface sign that is a sign drawn on a road surface is shown as the predetermined physical object F. In this case, the view-axis angular direction identifying unit 52 identifies an angular direction suggested by the road surface sign, based on the display of the road surface sign ("NORTH" in the illustrated example). Then, the view-axis angular direction identifying unit 52 identifies an angular direction ("NORTH" in the illustrated example) in which the view axis K is oriented, based on the position relation between the road surface sign and the camera 30. In the case where the predetermined physical object F is a sign, since the sign itself allows the discrimination from other features, it is unnecessary to put the discrimination sign Fa on the predetermined physical object, and the angular direction suggested by the sign is previously stored in the above angular direction information G.

In the case where the predetermined physical object F is an artificial product as shown in Examples 3 to 5, the predetermined physical object recognizing unit 48 detects the predetermined physical object F that is positioned on a side of a traveling road M (more precisely, a range within a predetermined distance and on the traveling road M as shown in Example 5 is included) on which the vehicle 1 is traveling, in steps S3 and S4 in FIG. 3, and the view-axis angular direction identifying unit 52 identifies the angular direction in which the view axis K is pointed, based on the predetermined physical object F.

By this operation, the predetermined physical object F for which the suggested angular direction indicates the angular direction of the traveling road M is detected by the predetermined physical object recognizing unit 48, and therefore, the angular direction of the traveling road M is also detected by the identification of the angular direction in which the view axis K is pointed. Accordingly, for example, in the case where the angular direction using apparatus 22 has an apparatus having a function to perform the tracking of the traveling road M, the angular direction using apparatus 22 can determine the right or wrong of the traveling road M for which the tracking is being performed, by comparing the angular direction indicated by the traveling road M recorded in map data or the like and the angular direction output from the angular direction identifying device 36.

The embodiment exerts the following effect.

The angular direction identifying device 36 in the embodiment includes the photographed image acquiring unit 40 that acquires the photographed image A1 by the camera 30 provided in the vehicle 1, the angular direction information acquiring unit 50 that acquires the angular direction information G indicating the angular direction suggested by the predetermined physical object F, in the case where the predetermined physical object F suggesting the angular direction is shown in the photographed image A1, and the view-axis angular direction identifying unit 52 that identifies the angular direction in which the view axis K is pointed, based on the angular direction information G and the position relation between the predetermined physical object F in the photographed image A1 and the view axis K of the camera 30.

According to this configuration, it is possible to identify the angular direction in which the view axis K of the camera 30 is pointed, without using the positioning by the GNSS receiver or the like. Thereby, it is possible to identify the angular direction even when the vehicle 1 is traveling in an environment that is unsuitable for the positioning.

The angular direction identifying device 36 in the embodiment includes the current position acquiring unit 42 that acquires the current position A2, and the current date and time acquiring unit 44 that acquires the current date and time A3. In the case where the angular direction suggested by the predetermined physical object F varies depending on the current position A2 and the current date and time A3, the above view-axis angular direction identifying unit 52 identifies the angular direction suggested by the predetermined physical object F based on the current position A2 acquired by the current position acquiring unit 42 and the current date and time A3 acquired by the current date and time acquiring unit 44, and identifies the angular direction in which the view axis K is pointed, based on the identified angular direction.

According to this configuration, it is also possible to treat, as the predetermined physical object F, a feature for which the suggested angular direction varies depending on the current position A2 and the current date and time A3. Thereby, it is possible to increase options of the feature that can be treated as the predetermined physical object F, and to enhance the convenience of the angular direction identifying device 36.

The angular direction identifying device 36 in the embodiment includes the predetermined physical object recognizing unit 48 that detects the predetermined physical object F from the photographed image A1, based on whether the discrimination sign Fa indicating that the predetermined physical object F is a physical object suggesting the angular direction is put on the predetermined physical object.

According to this configuration, it is possible to precisely detect the predetermined physical object F from the photographed image A1.

In the angular direction identifying device 36 in the embodiment, the view-axis angular direction identifying unit 52 identifies the angular direction in which the view axis K is pointed, based on the predetermined physical object F that is positioned on the side of the traveling road M on which the vehicle 1 is traveling in the photographed image A1.

According to this configuration, the angular direction in which the view axis K is pointed is identified based on the predetermined physical object F for which the suggested angular direction indicates the angular direction of the traveling road M. Thereby, the angular direction of the traveling road M can be also identified by the angular direction in which the view axis K is pointed.

The angular direction identifying device 36 in the embodiment includes the forward angular direction identifying unit 54 that identifies the angular direction in which the forward direction D1 of the vehicle 1 is pointed, based on the angular direction in which the view axis F is pointed.

According to this configuration, it is possible to identify the angular direction in which the forward direction D1 of the vehicle 1 is pointed, without using the positioning.

In the angular direction identifying device 36 in the embodiment, the view-axis angular direction identifying unit 52 identifies the angular direction in which the view axis K is pointed, in at least one of the case where the vehicle 1 is in the predetermined area and the case where the vehicle 1 is traveling.

According to this configuration, the operation is restrained from being performed in a situation in which the effectiveness of the angular direction identification is low.

The above-described embodiment is just an exemplary aspect of the present invention. That is, the above-described embodiment can be arbitrarily modified and applied without departing from the spirit of the present invention, and modes relevant to the embodiments, the modifications and the applications can be arbitrarily combined.

In the above-described embodiment, the number of cameras 30 that are installed is not limited to one, and may be two or more. In this case, the angular direction identifying device 36 performs the process shown in FIG. 3 to each photographed image A1 of the cameras 30, and thereby, can identify the angular direction in which the view axis K of each camera 30 is pointed. Further, the angular direction identifying device 36 can more accurately identify the angular direction in which the forward direction D1 of the vehicle 1 is pointed, using the identification result of the angular direction in which the view axis K of each camera 30 is pointed.

In the above-described embodiment, the physical object data source 46 included in the angular direction identifying device 36 may be provided in other in-vehicle devices included in the vehicle 1, or in an external computer connected with an electric communication line such as the Internet.

In the above-described embodiment, the angular direction identifying device 36 may be incorporated in the angular direction using apparatus 22.

In the above-described embodiment, the case where the discrimination sign Fa is put on the artificial product that is the predetermined physical object F has been exemplified. However, in the case where the artificial product (including a part of the artificial product) has a unique shape, pattern or color or a combination of the shape, the pattern and the color (referred to as a "shape or the like" hereinafter) that allows the discrimination from other physical bodies, the shape or the like may be used instead of the discrimination sign Fa.

In the above-described embodiment, the configuration in which the view-axis angular direction identifying unit 52 identifies the angular direction in which the view axis K is pointed in the case where the predetermined operation start condition is satisfied (FIG. 3: step S1: Yes) has been exemplified, but the view-axis angular direction identifying unit 52 may identify the angular direction in which the view axis K is pointed, regardless of whether the predetermined operation start condition is satisfied. Furthermore, in this case, the forward angular direction identifying unit 54 may execute the process of identifying the angular direction in which the forward direction D1 is pointed (FIG. 3: step S7), when the predetermined operation start condition in step S1 shown in FIG. 3 is satisfied.

In the above-described embodiment, the movable body may be an airplane, a ship, a drone, a robot or the like, instead of the vehicle 1.

The functional blocks shown in FIG. 2 show a schematic diagram in which constituent elements of the angular direction identifying device 36 are classified according to main processing contents for facilitating understanding the present invention, and the constituent elements of the angular direction identifying device 36 can be classified into a larger number of constituent elements according to processing contents. Further, the classification can be performed such that one constituent element executes a larger number of processes.

Further, the process of each constituent element of the angular direction identifying device 36 may be executed by one hardware device, or may be executed by a plurality of hardware devices. Further, the process of each constituent element may be realized by one program, or may be realized by a plurality of programs.

Configurations Supported by Disclosure of Present Specification

The disclosure of the present specification supports the following configurations.
(Configuration 1)
An angular direction identifying device comprising: a photographed image acquiring unit configured to acquire a photographed image by a camera provided in a movable body; an angular direction information acquiring unit configured to acquire angular direction information in a case where a predetermined physical object suggesting an angular direction is shown in the photographed image, the angular direction information indicating the angular direction suggested by the predetermined physical object; and a view-axis angular direction identifying unit configured to identify an angular direction in which a view axis of the camera is pointed, based on the angular direction information and a position relation between the predetermined physical object in the photographed image and the view axis of the camera.

According to Configuration 1, it is possible to identify the angular direction without using the positioning.
(Configuration 2)
The angular direction identifying device according to Configuration 1, comprising: a current position acquiring unit configured to acquire a current position; and a current date and time acquiring unit configured to acquire a current date and time, wherein in a case where the angular direction suggested by the predetermined physical object varies depending on the current position and the current date and time, the view-axis angular direction identifying unit identifies the angular direction suggested by the predetermined physical object based on the current position acquired by the current position acquiring unit and the current date and time acquired by the current date and time acquiring unit, and identifies the angular direction in which the view axis is pointed, based on the identified angular direction.

According to Configuration 2, it is possible to increase options of the feature that can be treated as the predetermined physical object, and enhance the convenience of the angular direction identifying device.
(Configuration 3)
The angular direction identifying device according to Configuration 1 or 2, comprising a predetermined physical object recognizing unit configured to detect the predetermined physical object from the photographed image based on whether a discrimination sign is put on the predetermined physical object, the discrimination sign indicating that the predetermined physical object is a physical object suggesting the angular direction.

According to Configuration 3, it is possible to precisely detect the predetermined physical object from the photographed image.
(Configuration 4)
The angular direction identifying device according to any one of Configurations 1 to 3, wherein the view-axis angular direction identifying unit identifies the angular direction in which the view axis is pointed, based on the predetermined physical object that is positioned on a side of a movement route in the photographed image, the movement route being a route on which the movable body is moving.

According to Configuration 4, the angular direction of the movement route can be also identified by the identification of the angular direction in which the view axis is pointed.
(Configuration 5)

The angular direction identifying device according to any one of Configurations 1 to 4, comprising a forward angular direction identifying unit configured to identify an angular direction in which a forward direction of the movable body is pointed, based on the angular direction in which the view axis is pointed.

According to Configuration 5, it is possible to identify the angular direction in which the forward direction of the movable body is pointed, without using the positioning.
(Configuration 6)

The angular direction identifying device according to any one of Configurations 1 to 5, wherein the view-axis angular direction identifying unit identifies the angular direction in which the view axis is pointed, in at least one of a case where the movable body is in a predetermined area and a case where the movable body is moving.

According to Configuration 6, the operation is restrained from being performed in a situation in which the effectiveness of the angular direction identification is low.
(Configuration 7)

An angular direction identifying method with an angular direction identifying device that identifies an angular direction, the angular direction identifying method comprising: a step of acquiring a photographed image by a camera provided in a movable body; a step of acquiring angular direction information in a case where a predetermined physical object suggesting an angular direction is shown in the photographed image, the angular direction information indicating the angular direction suggested by the predetermined physical object; and a step of identifying an angular direction in which a view axis of the camera is pointed, based on the angular direction information and a position relation between the predetermined physical object in the photographed image and the view axis of the camera.

According to Configuration 7, it is possible to identify the angular direction without using the positioning.

REFERENCE SIGNS LIST

1 Vehicle (Movable body)
20 Angular direction identifying system
22 Angular direction using apparatus
30 Camera
36 Angular direction identifying device
40 Photographed image acquiring unit
42 Current position acquiring unit
44 Current date and time acquiring unit
48 Predetermined physical object recognizing unit
50 Angular direction information acquiring unit
52 View-axis angular direction identifying unit
54 Forward angular direction identifying unit
A1 Photographed image
A2 Current position
A3 Current date and time
D1 Forward direction
F Predetermined physical object
Fa Discrimination sign
G Angular direction information
K View axis

What is claimed is:

1. An angular direction identifying device comprising a processor that includes:

a photographed image acquiring unit configured to acquire a photographed image by a camera provided in a movable body;

an angular direction information acquiring unit configured to acquire angular direction information in a case where a predetermined physical object suggesting an angular direction is shown in the photographed image, the angular direction information indicating the angular direction suggested by the predetermined physical object;

a view-axis angular direction identifying unit configured to identify an angular direction in which a view axis of the camera is pointed, based on the angular direction information and a position relation between the predetermined physical object in the photographed image and the view axis of the camera; and a predetermined physical object recognizing unit configured to detect the predetermined physical object from the photographed image based on whether a discrimination sign is put on the predetermined physical object, the discrimination sign indicating that the predetermined physical object is a physical object suggesting the angular direction, wherein when the predetermined physical object suggesting the angular direction detected by the predetermined physical object recognizing unit is a pole group comprising a plurality of poles arranged in an array direction, the view-axis angular direction identifying unit identifies a direction suggested by the array direction of the pole group, based on the angular direction information, and the view-axis angular direction identifying unit identifies a direction in which the view axis is oriented, based on a position relation between the array direction of the pole group in the photographed image and the view axis of the camera.

2. The angular direction identifying device according to claim 1, wherein the processor includes a forward angular direction identifying unit configured to identify an angular direction in which a forward direction of the movable body is pointed, based on the angular direction in which the view axis is pointed.

3. The angular direction identifying device according to claim 1, wherein the view-axis angular direction identifying unit identifies the angular direction in which the view axis is pointed, in at least one of a case where the movable body is in a predetermined area and a case where the movable body is moving.

4. An angular direction identifying method with an angular direction identifying device that identifies an angular direction, the angular direction identifying method comprising:

a step of acquiring a photographed image by a camera provided in a movable body;

a step of acquiring angular direction information in a case where a predetermined physical object suggesting an angular direction is shown in the photographed image, the angular direction information indicating the angular direction suggested by the predetermined physical object;

a view-axis angular direction identifying step of identifying an angular direction in which a view axis of the camera is pointed, based on the angular direction information and a position relation between the predetermined physical object in the photographed image and the view axis of the camera; and a predetermined physical object recognizing step of detecting the predetermined physical object from the photographed image based on whether a discrimination sign is put on the predetermined physical object, the discrimination sign indicating that the predetermined physical object is a physical object suggesting the angular direction, wherein when the predetermined physical object suggesting the angular direction detected in the predetermined physical object recognizing step is a pole group comprising a plurality of poles arranged in an array direction, the view-axis angular direction identifying step identifies a direction suggested by the array direction of the pole group, based on the angular direction information, and the view-axis angular direction identifying step identifies a direction in which the view axis is oriented, based on a position relation between the array direction of the pole group in the photographed image and the view axis of the camera.

5. The angular direction identifying device according to claim 1, wherein on a pole that is of the pole group and that corresponds to a starting point in the array direction, a starting point sign indicating the starting point is put, and on a pole that is of the pole group and that corresponds to an ending point in the array direction, an ending point sign indicating the ending point is put, and the view-axis angular direction identifying unit identifies the direction indicated by the array direction, based on the starting point sign and the ending point sign.

* * * * *